United States Patent

[11] 3,621,046

| [72] | Inventors | Abe Berger;<br>Terry G. Selin, both of Schenectady, N.Y. |
|---|---|---|
| [21] | Appl. No. | 789,397 |
| [22] | Filed | Jan. 6, 1969 |
| [45] | Patented | Nov. 16, 1971 |
| [73] | Assignee | General Electric Company |

[54] ORGANOSILICON COMPOUNDS
3 Claims, No Drawings

[52] U.S. Cl. .................................................. 260/448.8 R,
260/448.2 E
[51] Int. Cl. .............................................. C07f 7/04,
C07f 7/18

[50] Field of Search ............................................ 260/448.8

[56] References Cited
UNITED STATES PATENTS
3,388,144   6/1968   Musolf et al. .................. 260/448.8

*Primary Examiner*—Tobias E. Levow
*Assistant Examiner*—P. F. Shaver
*Attorneys*—Donovan L. Favre, Frank L. Neuhauser and Oscar B. Waddell

ABSTRACT: Monomeric organosilicon compounds having an alkyl substituent with two thioacid ester groups.

ORGANOSILICON COMPOUNDS

The present invention relates to monomeric organosilicon compounds of the formula,

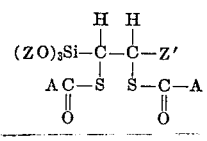

wherein A and Z are each hydrocarbon groups of up to 15 carbon atoms, and Z' is Z or hydrogen.

Among the hydrocarbon radicals represented by A and Z are alkyl radicals, such as methyl, ethyl, propyl, butyl, octyl, dodecyl, isopropyl, isobutyl, etc., cycloalkyl radicals, such as cyclohexyl, cyclopentyl, cycloheptyl, etc., aryl radicals, such as phenyl, biphenyl, naphthyl, benzoylphenyl, paraphenoxyphenyl, tolyl, xylyl, etc., aralkyl radicals, such as benzyl, phenethyl, etc.

The organosilicon compounds of this invention are formed by reaction of a trialkoxy chlorosilane with an alkynyl metal according to the reaction:

(1) $(ZO)_3SiCl + MC{\equiv}C-Z' \rightarrow (ZO)_3SiC{\equiv}C-Z' + MCl$;

where Z is as previously defined and M is selected from the class consisting of lithium, sodium, potassium, and XMg where X is a halide selected from the class consisting of chloride, bromide, and iodide followed by reaction of the alkynyl silane with a thioacid according to the reaction:

(2)
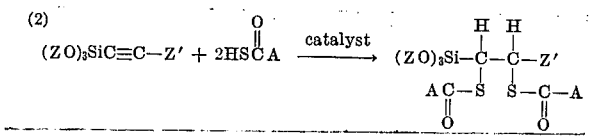

where A, Z', and Z are as previously defined.

The reaction between the alkoxy silane according to (1) is a standard one involving a halogenated compound and an organometallic compound where the metal halide is formed through the reaction. The trihydrocarbonoxy alkynyl silanes are also available by other routes.

The reaction represented by (2) is catalyzed by any of the standard free radical catalysts such as azo and peroxide and the reaction can be run at various temperatures from about 25° C. to about 140° C. A reaction medium is not required although hydrocarbon media such as benzene can be used if desired.

To better enable an understanding of the present invention, the following examples are given as illustrations. These should not be considered as limiting in any way the full scope of the invention as covered in the appended claims. All parts in the following examples are by weight.

EXAMPLE 1

Into a reaction vessel were placed 270 parts of a 60 percent mixture of vinyl triethoxysilane and 40 percent ethynyltriethoxysilane and 152 parts of purified thioacetic acid. This mixture was irradiated with ultraviolet light for a period of 24 hours at 25° C. The mixture was fractionated and the portion boiling at from 100° to 150° C. and 2.5 mm. pressure collected. This product was refractionated and a product collected at 113°–114° C. and 0.5 mm. pressure in a yield of 65 percent which, by vapor phase chromatography, was 99 percent pure. An infrared scan was consistent with the structure:

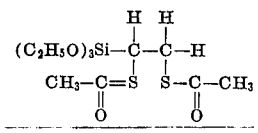

The compounds of the present invention are useful in the preparation of compounds having a single alkyl substituent with two mercaptan groups thereon according to the following representative synthesis:

0001

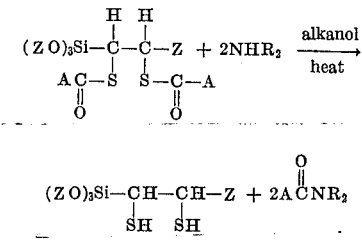

wherein R is selected from the group consisting of lower ($C_1$–$C_6$) alkyl and phenyl, and A and Z are as defined above. Further details are given in application Ser. No. 796,633 filed of even date herewith in the name of Abe Berger and assigned to the assignee of the present invention. These monomeric organosilicon compounds containing two mercaptan groups can be reacted, through methods well known in the art, to form organopolysiloxanes with these mercaptoalkyl substituents. Such polysiloxanes are useful, for example, as metal protectants as disclosed in U.S. Pat. No. 3,346,405 of R. V. Viventi, assigned to the same assignee as the present invention.

What I claim as new and desire to secure by Letters Patent of the United States is:

1. Compounds of the formula,

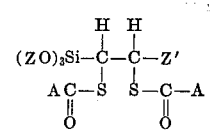

where A and Z are each hydrocarbon groups of up to 15 carbon atoms and Z' is selected from the same groups as Z, and hydrogen.

2. Compound of claim 1, wherein A and Z are each alkyl.

3. Compound of claim 1, wherein A and Z are each methyl, and Z' is hydrogen.

* * * * *